United States Patent
Fukuda et al.

(10) Patent No.: US 6,943,216 B2
(45) Date of Patent: Sep. 13, 2005

(54) CURABLE COMPOSITIONS AND ELECTRIC/ELECTRONIC PARTS

(75) Inventors: Kenichi Fukuda, Gunma-ken (JP); Mikio Shiono, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 117 days.

(21) Appl. No.: 10/614,984

(22) Filed: Jul. 9, 2003

(65) Prior Publication Data

US 2004/0014889 A1 Jan. 22, 2004

(30) Foreign Application Priority Data

Jul. 10, 2002 (JP) .......................................... 2002-201349

(51) Int. Cl.$^7$ .......................... C08L 27/10; C08L 43/00
(52) U.S. Cl. ........................................ 525/200; 525/209
(58) Field of Search ................................. 525/200, 209

(56) References Cited

U.S. PATENT DOCUMENTS

| | | | |
|---|---|---|---|
| 4,085,137 A | | 4/1978 | Mitsch et al. |
| 4,094,911 A | | 6/1978 | Mitsch et al. |
| 4,771,119 A | | 9/1988 | Wrobel |
| 5,656,711 A | * | 8/1997 | Fukuda et al. ................. 528/15 |
| 6,040,400 A | | 3/2000 | Fukuda et al. |
| 6,414,062 B1 | * | 7/2002 | Fukuda et al. ............... 524/267 |

FOREIGN PATENT DOCUMENTS

| | | |
|---|---|---|
| EP | 1 167 453 A2 | 1/2002 |
| EP | 1 223 194 A1 | 7/2002 |
| JP | 56-143241 A | 11/1981 |
| JP | 63-33475 A | 2/1988 |
| JP | 7-324165 A | 12/1995 |
| JP | 63-35655 A | 2/1998 |
| JP | 11-116685 A | 4/1999 |
| WO | WO 02/02668 A2 | 1/2002 |

* cited by examiner

*Primary Examiner*—Nathan M. Nutter
(74) *Attorney, Agent, or Firm*—Birch, Stewart, Kolasch & Birch, LLP

(57) ABSTRACT

A curable composition comprising an alkenyl-containing fluoropolymer comprising —(CF(CF$_3$)—CF$_2$—O)— units, an alkenyl-free, non-functional fluoropolymer comprising —[(CF$_2$)$_k$O]— units wherein k is 1 to 6, an organohydrogensiloxane and a catalyst, in the cured state, remains flexible even at low temperatures, minimizes the bleeding of free oil ingredients from the gel under stresses or thermal cycling, and has chemical resistance.

7 Claims, 1 Drawing Sheet

CURABLE COMPOSITIONS AND ELECTRIC/ELECTRONIC PARTS

This invention relates to fluorinated curable compositions of the addition curing type which cure into products having good chemical and solvent resistance, minimized bleeding and improved low-temperature characteristics, and are suited for the potting, sealing and coating of electric and electronic parts; and electric and electronic parts encapsulated therewith.

BACKGROUND OF THE INVENTION

Silicone rubbers in the cured state have good electrically and thermally insulating properties, stable electric properties and flexibility. They are useful as potting and encapsulating materials for electric and electronic parts, and coating materials for protecting control circuit devices such as power transistors, ICs and capacitors from external, thermal and mechanical damages. In particular, gel-like cured products are best suited in these applications because of their low modulus.

Typical examples of silicone rubber compositions forming such cured gel products are organopolysiloxane compositions of the addition curing type. The organopolysiloxane compositions of the addition curing type are known, for example, from JP-A 56-143241, 63-35655 and 63-33475 as comprising an organopolysiloxane having a vinyl group attached to a silicon atom and an organohydrogenpolysiloxane having a hydrogen atom attached to a silicon atom, wherein crosslinking reaction takes place in the presence of a platinum group catalyst to form a silicone gel.

A fluorosilicone gel composition comprising an organopolysiloxane having trifluoropropyl groups is known from JP-A 7-324165.

However, silicon gels resulting from such organopolysiloxane compositions of the addition curing type are prone to degradation or swelling upon exposure to such chemicals as strong bases and strong acids or such solvents as toluene, alcohols and gasoline, often failing to maintain their performance.

As one solution to this problem, JP-A 11-116685 discloses a fluorochemical gel composition comprising a polyfluoro compound having two alkenyl groups and a divalent perfluoropolyether group in a molecule, an organohydrogenpolysiloxane having a hydrogen atom attached to a silicon atom, and a platinum group catalyst as well as a fluorochemical gel product resulting from curing thereof.

The above-described gel, however, when used as a protective agent, fails to achieve satisfactory coating/protecting effects upon contact with strong acids or strong bases in gas or liquid state. Due to the unsatisfactory coating/protecting effects, electric and electronic parts can be attacked by acids or bases, failing to offer their own performance or becoming inoperative. It is also pointed out that under stresses resulting from varying pressure and due to thermal cycling, free oil ingredients bleed out of the gel, contaminating adjacent electric and electronic parts. Such contamination also gives rise to a problem that electric and electronic parts fail to offer their own performance or become inoperative. When it is desired to apply another material to the cured gel, the influence of adversely affecting adhesion and wetting is a problem. Further, when the cured products are used with electric and electronic parts to be operated at low temperatures (around or below −30° C.), the elastic behavior at low temperatures is inferior because the composition has a glass transition temperature (Tg) of approximately −45° C. (embrittlement temperature approximately −20° C.). As a result, a problem occurs in cold areas that electric and electronic parts fail to offer their own performance or become inoperative. Especially for electric and electronic parts to be mounted on automobiles, the operation at low temperatures (below −30° C.) is of significance, suggesting a need for a material having a Tg below −70° C. (embrittlement temperature below −30° C.). In the prior art, silicone (Tg −120° C.) and fluorosilicone (Tg −75° C.) are used as the coating material for electric and electronic parts to be used in a freezing environment. These silicones both have a Tg below −70° C. and exhibit good elastic behavior at low temperatures.

It would be desirable to have a curable composition which cures into a product having chemical resistance, minimized bleeding and improved low-temperature characteristics including a Tg of −70° C. or below.

SUMMARY OF THE INVENTION

An object of the invention is to provide a curable composition capable of forming a cured gel product that remains flexible even at low temperatures, minimizes the bleeding of free oil ingredients from the gel under the impetus of stresses resulting from varying pressure or due to thermal cycling, and has good chemical resistance. Another object is to provide electric and electronic parts encapsulated with the composition.

The inventor has discovered that when a curable composition of the addition reaction curing type having an alkenyl-containing fluoropolymer comprising —(CF(CF$_3$)—CF$_2$—O)— units, combined with an alkenyl-free, non-functional fluoropolymer comprising —[(CF$_2$)$_k$O]— units wherein k is 1 to 6, is cured, the resulting gel product remains flexible even at low temperatures and minimizes the bleeding of free oil ingredients under the impetus of stresses or due to thermal cycling.

According to the invention, there is provided a curable composition comprising (A) 100 parts by weight of an alkenyl-containing fluoropolymer comprising —(CF(CF$_3$)—CF$_2$—O)— units, (B) 20 to 40 parts by weight of an alkenyl-free, non-functional fluoropolymer comprising —[(CF$_2$)$_k$O]— units wherein k is 1 to 6, (C) a cure effective amount of an organohydrogensiloxane having at least two hydrogen atoms each attached to a silicon atom in a molecule, and (D) a catalytic amount of a platinum group metal catalyst.

DESCRIPTION OF THE PREFERRED EMBODIMENTS

Component (A)

Figure 1:
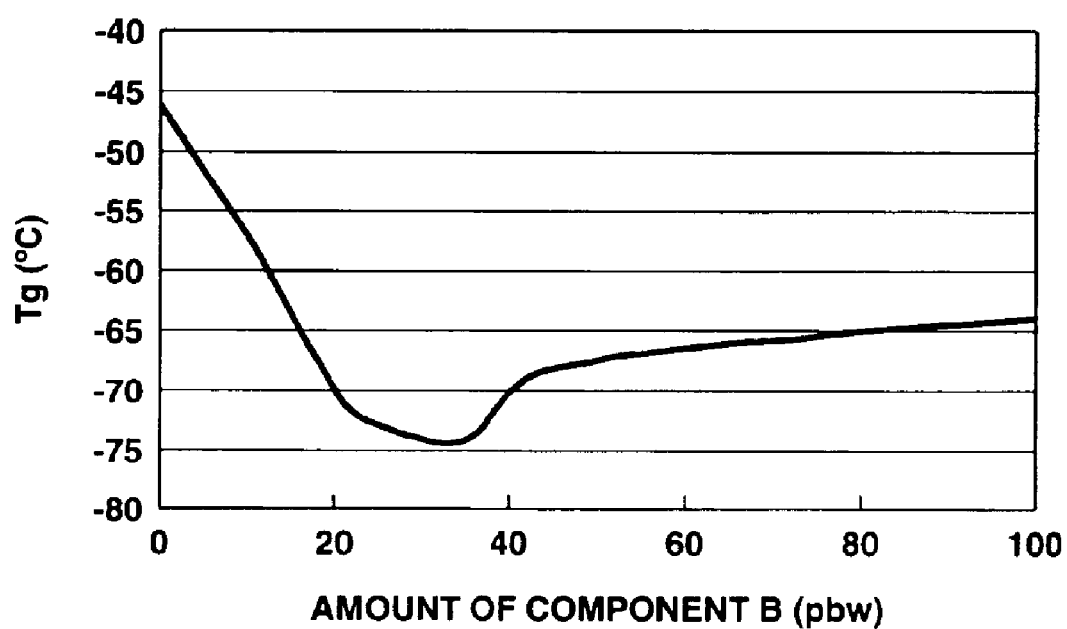
FIG. 1 is a graph showing changes of Tg of the cured composition of Example 1 with varying amounts of component (B).

Component (A) in the curable composition of the invention is an alkenyl-containing fluoropolymer comprising —(CF(CF$_3$)—CF$_2$—O)— units. This polymer is also referred to as a branched polyfluorodialkenyl compound and preferably has the following general formula (1).

$$CH_2=CH-(X)_a-Rf^1-(X')_a-CH=CH_2 \qquad (1)$$

Herein X is a divalent group represented by —CH$_2$—, —CH$_2$O—, —CH$_2$OCH$_2$— or —Y—NR$^1$—CO— wherein Y is a divalent group represented by —CH$_2$— or

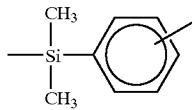

and R$^1$ is hydrogen or a substituted or unsubstituted monovalent hydrocarbon group. X' is a divalent group represented by —CH$_2$—, —OCH$_2$—, —CH$_2$OCH$_2$— or —CO—NR$^1$—Y'— wherein Y' is a divalent group represented by —CH$_2$— or

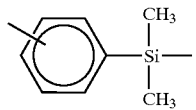

and R$^1$ is as defined above. The subscript "a" is independently equal to 0 or 1. Rf$^1$ is a divalent group having the general formula (i) or (ii).

—C$_t$F$_{2t}$—[OCF$_2$CF(CF$_3$)]$_p$—O—CF$_2$(CF$_2$)$_r$CF$_2$—O—[CF(CF$_3$)CF$_2$O]$_q$—C$_t$F$_{2t}$—    (i)

Herein p and q each are an integer of 1 to 150, the sum of p and q on average is 2 to 200, r is an integer of 0 to 6, and t is 2 or 3.

—C$_t$F$_{2t}$—[OCF$_2$CF(CF$_3$)]$_u$—(OCF$_2$)$_v$—OC$_t$F$_{2t}$—    (ii)

Herein u is an integer of 1 to 200, v is an integer of 1 to 50, and t is as defined above.

R$^1$ involved in X or X' is hydrogen or a substituted or unsubstituted monovalent hydrocarbon group, preferably having 1 to 12 carbon atoms, more preferably 1 to 10 carbon atoms. Suitable monovalent hydrocarbon groups include alkyl groups such as methyl, ethyl, propyl, butyl, hexyl, cyclohexyl and octyl, aryl groups such as phenyl and tolyl, aralkyl groups such as benzyl and phenylethyl, and substituted monovalent hydrocarbon groups in which some or all of the hydrogen atoms are substituted with halogen atoms such as fluorine.

As mentioned above, Rf$^1$ is a divalent group having the general formula (i) or (ii).

—C$_t$F$_{2t}$—[OCF$_2$CF(CF$_3$)]$_p$—O—CF$_2$(CF$_2$)$_r$CF$_2$—O—[CF(CF$_2$O]$_q$—C$_t$F$_{2t}$—    (i)

—C$_t$F$_{2t}$—[OCF$_2$CF(CF$_3$)]$_u$—(OCF$_2$)$_v$—OC$_t$F$_{2t}$—    (ii)

Herein p, q, r, u, v and t are as defined above.

Exemplary of the group of formula (i) are groups of the following formula (i'):

—CF$_2$CF$_2$—[OCF$_2$CF(CF$_3$)]$_s$—O—CF$_2$(CF$_2$)$_r$CF$_2$—O—[CF(CF$_3$)CF$_2$O]$_t$—CF$_2$CF$_2$—    (i')

wherein s and t each are an integer of at least 1, the sum of s and t on average is 2 to 200.

The following three groups are illustrative of Rf$^1$ group, with divalent groups of the first formula being preferred.

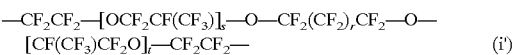

Herein m and n each are an integer of at least 1, and an average of m+n is 2 to 200.

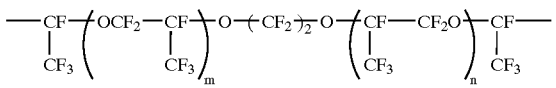

Herein m and n each are an integer of at least 1, and an average of m+n is 2 to 200.

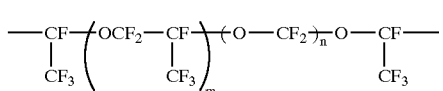

Herein m is an integer of 1 to 200 and n is an integer of 1 to 50.

Illustrative, non-limiting examples of the polyfluorodialkenyl compound having formula (1) are given below.

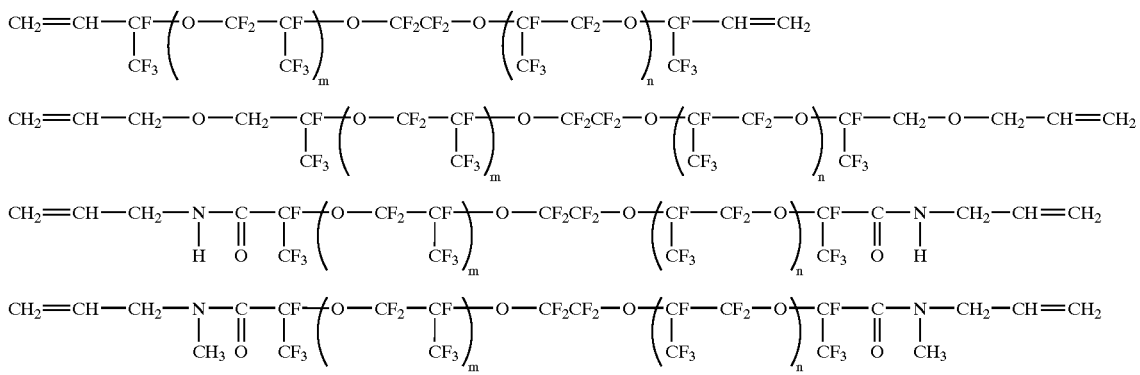

-continued

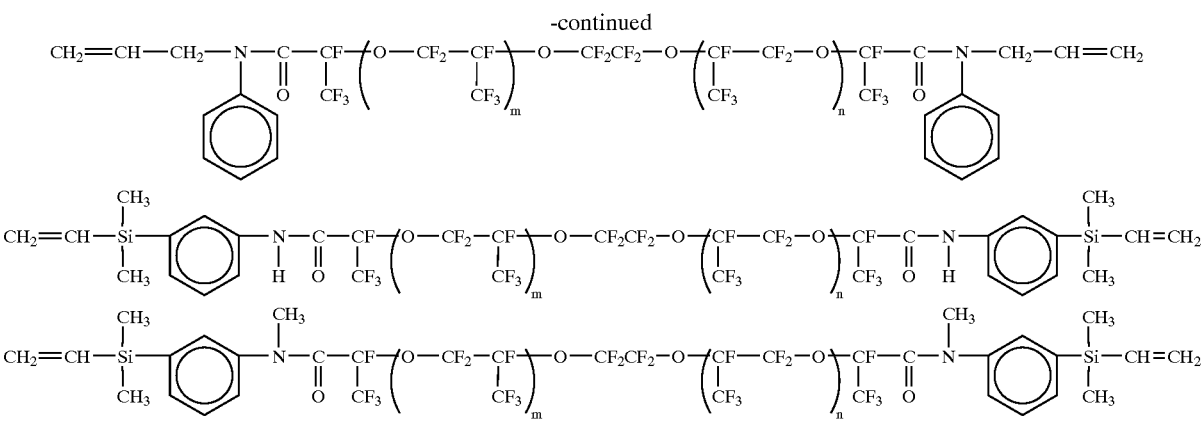

Herein m and n each are an integer of at least 1, and an average of m+n is 2 to 200.

The polyfluorodialkenyl compound having formula (1) should preferably have a viscosity in the range of 5 to 100,000 mPa·s at 23° C. Then the inventive composition comprising the same have an appropriate flow so that the composition is useful in casting, potting, coating, impregnation and adhesion, and that its cured product have appropriate physical properties. Depending on a particular application, a polyfluorodialkenyl compound having a most appropriate viscosity within the range may be selected.

While it is preferred in the practice of the invention to use the polyfluorodialkenyl compound of formula (1) as component (A), a polyfluoromonoalkenyl compound of the following formula (2) may be used in combination therewith.

$$Rf^2—(X')_a—CH=CH_2 \quad (2)$$

Herein X' and "a" are as defined above, $Rf^2$ is a group of the general formula (iii):

$$F—[CF(CF_3)CF_2O]_w—C_tF_{2t}— \quad (iii)$$

wherein t is as defined above, and w is an integer of 1 to 150, which is smaller than any of the sum of p+q (average) and r and the sum of u and v for $Rf^1$ in formula (1).

The definition of w in $Rf^2$ group in relation to $Rf^1$ group in the polyfluorodialkenyl compound as component (A) is essential for the inventive composition to form a low-bleeding cured product.

Illustrative, non-limiting examples of the polyfluoromonoalkenyl compound having formula (2) are given below.

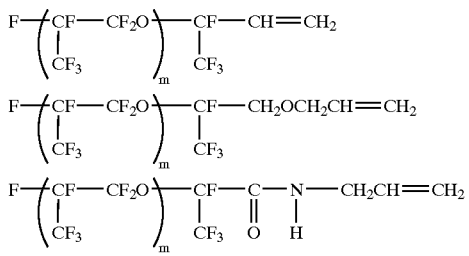

-continued

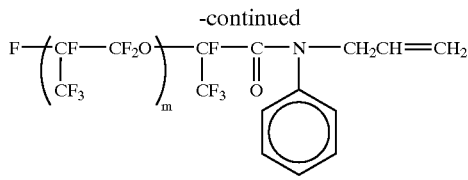

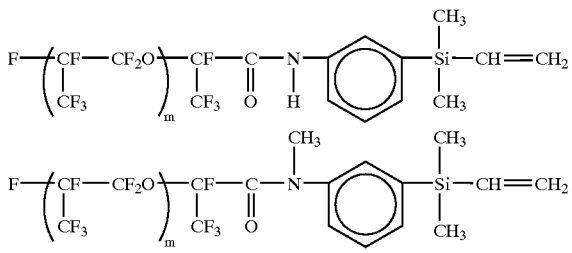

m = 1 to 200

Note that m is an integer of 1 to 200, satisfying the requirement of w.

An appropriate amount of the polyfluoromonoalkenyl compound of formula (2) added is 1 to 300 parts by weight, preferably 50 to 250 parts by weight per 100 parts by weight of the polyfluorodialkenyl compound of formula (1). Like the polyfluorodialkenyl compound, the polyfluoromonoalkenyl compound should preferably have a viscosity in the range of 5 to 100,000 mPa·s at 23° C.

Component (B)

Component (B) is a non-functional fluoropolymer comprising —[$(CF_2)_kO$]— units wherein k is 0.1 to 6, and free of alkenyl groups, which is preferably linear.

The linear polyfluoro compound, when blended, serves to improve the chemical resistance, solvent resistance and low-temperature characteristics of the composition at no expense of physical properties.

Component (B) is preferably a linear polyfluoro compound selected from compounds having the general formulae (3) and (4).

$$A-O—(CF_2CF_2CF_2O)_c-A \quad (3)$$

Herein A is a group of the formula: $C_sF_{2s+1}$— wherein s is 1 to 3, and c is an integer of 1 to 200, which is smaller than any of the sum of p+q (average) and r and the sum of u and v for $Rf^1$ in formula (1).

$$A-O—(CF_2O)_d(CF_2CF_2O)_e-A \quad (4)$$

Herein A is as defined above, d and e each are an integer of 1 to 200, and the sum of d and e is equal to or smaller than any of the sum of p+q (average) and r and the sum of u and v for $Rf^1$ in formula (1) (i.e., d+e≦p+q+r and d+e≦u+v).

The definition of c, d and e in formulae (3) and (4) in relation to $Rf^1$ group in formula (1) as component (A) is essential for the inventive composition to form a low-bleeding cured product.

Illustrative, non-limiting examples of the polyfluoro compound are given below.

$$CF_3-(CF_2CF_2CF_2O)_n-CF_2CF_3$$

$$CF_3-[(OCF_2CF_2)_n(OCF_2)_m]-O-CF_3$$

Note that m is an integer of 1 to 200, n is an integer of 1 to 200, and m+n is 1 to 200, satisfying the requirement of c, d and e.

The amount of component (B) compounded must be 20 to 40 parts by weight per 100 parts by weight of component (A), that is, the polyfluorodialkenyl compound and polyfluoromonoalkenyl compound combined. The polyfluoro compounds serving as component (B) may be used alone or in admixture.

The invention aims to provide a curable composition that exhibits good elastic behavior at low temperatures and especially, a composition having a glass transition temperature (Tg) of −70° C. or lower as needed for the automobile-related material. Less than 20 pbw of component (B) fails to provide a composition having a Tg below −70° C., leaving a possibility that electronic parts encapsulated therewith malfunction. More than 40 pbw of component (B) invites a loss of compatibility with component (A) and leads to a rise of Tg despite component (B) being incorporated, failing to accomplish the desired low-temperature characteristics.

Component (C)

Component (C) is an organohydrogensiloxane having at least two hydrogen atoms each attached to a silicon atom (i.e., Si—H groups) in a molecule. It serves as a crosslinker and chain extender for component (A). For compatibility and dispersion with components (A) and (B) and cured uniformity, component (C) should preferably have at least one fluorinated group in a molecule.

The fluorinated groups include, for example, groups of the following general formulae.

$$C_{s'}F_{2s'+1}-$$

Herein s' is an integer of 1 to 20, preferably 2 to 10.

$$F-[CF(CF_3)CF_2O]_n-C_tF_{2t}-$$

Herein n is an integer of 2 to 200, preferably 2 to 100, and t is an integer of 1 to 3.

$$C_{t'}F_{2t'}-$$

Herein t' is an integer of 1 to 20, preferably 2 to 10.

$$-CF(CF_3)-[OCF_2CF(CF_3)]_m-O-CF_2CF_2-O-[CF(CF_3)CF_2O]_n-CF(CF_3)-$$

Herein m and n each are an integer of at least 1, and an average of m+n is 2 to 200, preferably 2 to 100.

Examples of the organohydrogensiloxane compound having a fluorinated group (C) are given below. These compounds may be used alone or in admixture of two or more. Note that Me is methyl and Ph is phenyl.

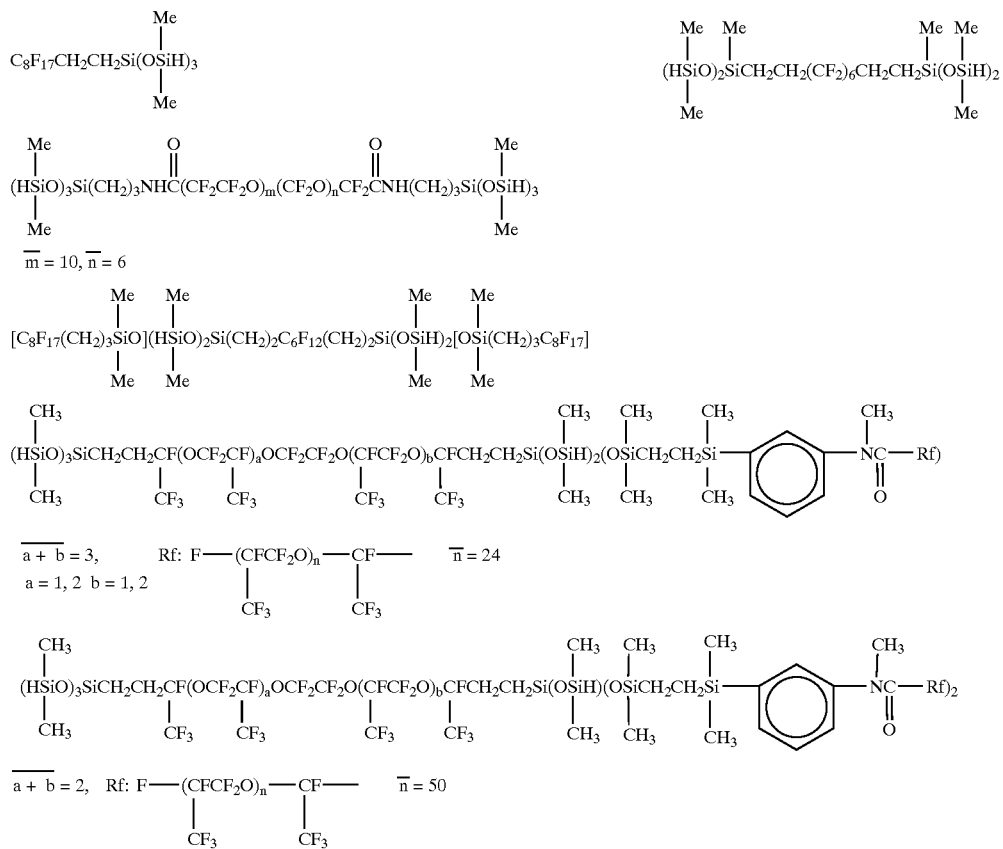

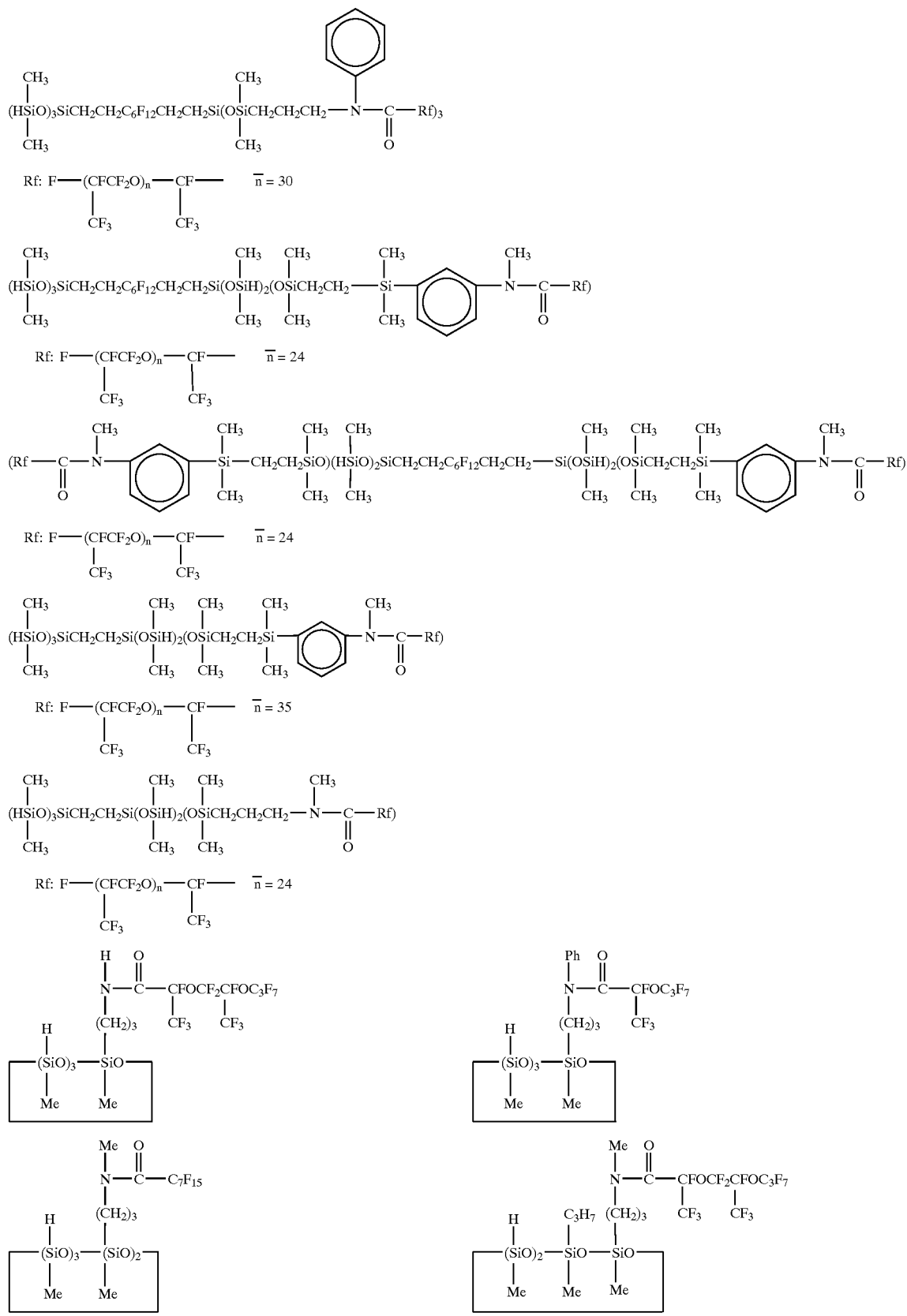

-continued
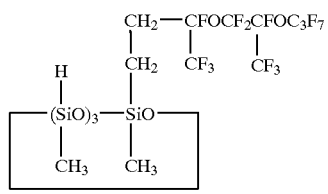
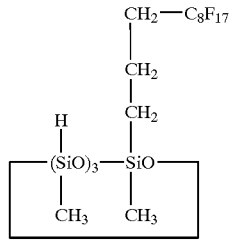
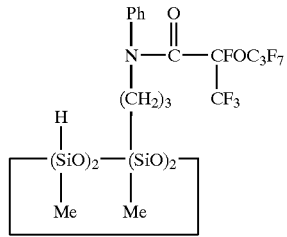
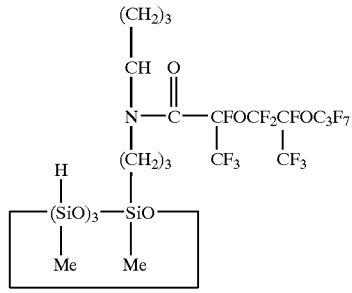
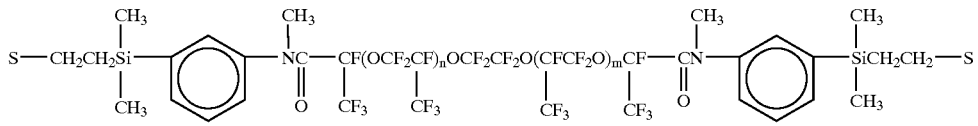
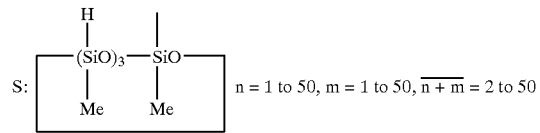
n = 1 to 50, m = 1 to 50, $\overline{n+m}$ = 2 to 50
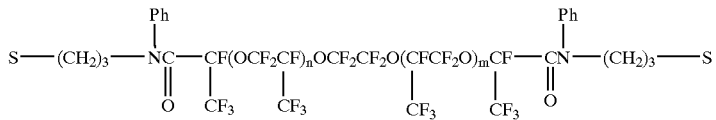
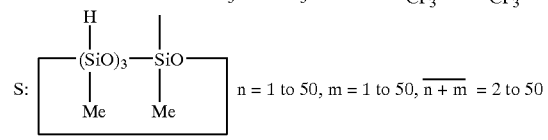
n = 1 to 50, m = 1 to 50, $\overline{n+m}$ = 2 to 50
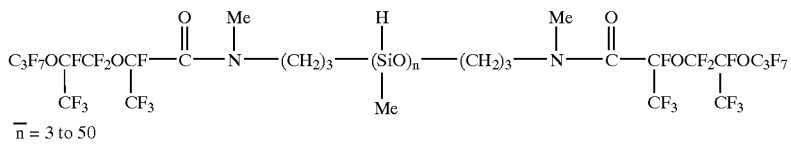
$\overline{n}$ = 3 to 50

-continued

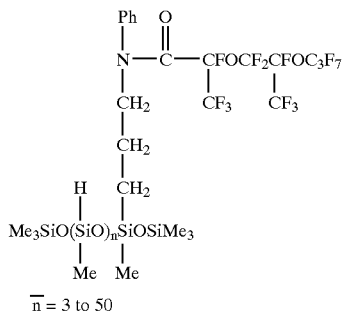

n = 3 to 50

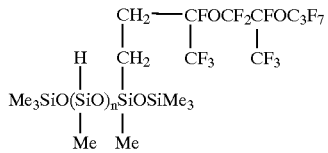

n = 3 to 50          n = 3 to 50

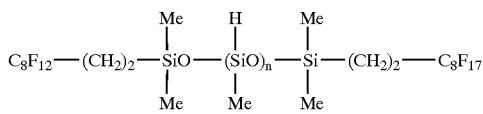

n = 3 to 50

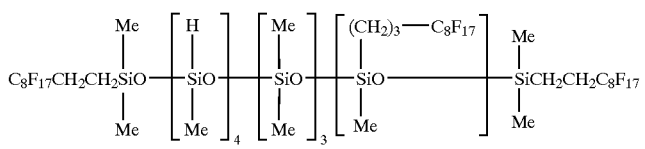

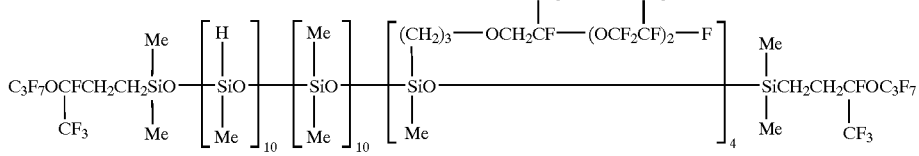

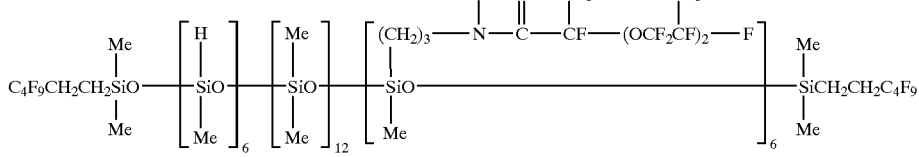

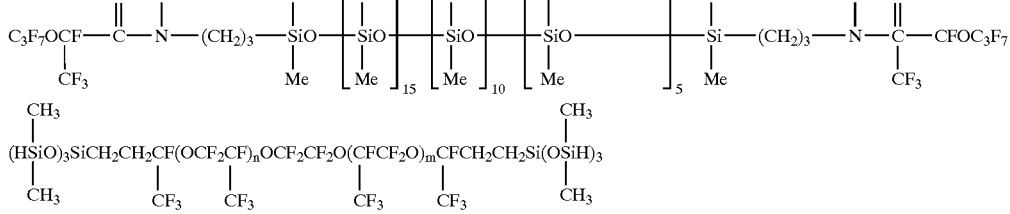

n = 1 to 50, m = 1 to 50, $\overline{n+m}$ = 2 to 50

Component (C) is used in an effective amount for component (A) to cure, and preferably such that 0.2 to 2 moles, more preferably 0.5 to 1.3 moles of hydrosilyl (Si—H) groups in component (C) are available per mole of entire alkenyl groups in component (A) in the composition. Less amounts of hydrosilyl groups may lead to a lower degree of crosslinking, resulting in undercure. More amounts of hydrosilyl groups can cause foaming during the cure.

Component (D)

Component (D) is a platinum group metal catalyst for promoting the addition reaction between alkenyl groups in component (A) and hydrosilyl groups in component (C). Of these catalysts, platinum compounds which are relatively easily available are often employed. The platinum compounds include, for example, chloroplatinic acid, complexes of chloroplatinic acid with olefins such as ethylene, alcohols and vinylsiloxanes, and metallic platinum on silica, alumina or carbon, though not limited thereto. Known examples of the platinum group compounds other than the platinum compound are rhodium, ruthenium, iridium and palladium compounds, for example, RhCl(PPh$_3$)$_3$, RhCl(CO)(PPh$_3$)$_2$, $Ru_3(CO)_{12}$, $IrCl(CO)(PPh_3)_2$, and $Pd(PPh_3)_4$ wherein Ph is phenyl.

The catalyst is used in a catalytic amount. Usually, the preferred amount of the catalyst is about 0.1 to 100 parts by weight of platinum group metal per million parts by weight of components (A) and (C) combined.

Other Components

In addition to the above-described components (A) to (D), the composition of the invention may further contain various additives. Such optional components include regulators for hydrosilylation catalysts, for example, acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutynol, 3-methyl-3-penten-1-yne, 3,5-dimethyl-3-hexen-1-yne, etc., polymethylvinylsiloxane cyclic compounds, and organic phosphorus compounds. These regulators are effective for maintaining curing reactivity and storage stability appropriate. Other optional components include inorganic fillers, for example, iron oxide, zinc oxide, titanium oxide, calcium carbonate, magnesium carbonate, zinc carbonate, and carbon black. By adding such inorganic fillers to the inventive composition, the hardness and mechanical strength of cured gel can be adjusted. There may be added hollow inorganic fillers and spherical rubbery fillers as well. Well-known tackifiers having epoxy, alkoxy or other groups for imparting adhesion may also be added. The amounts of these optional components added are arbitrary insofar as they do not compromise the properties of the composition and the physical properties of cured gel.

which can be encapsulated with the inventive composition in the cured state include gas pressure sensors, hydraulic pressure sensors, temperature sensors, humidity sensors, rotation sensors, gravity sensors, timing sensors, air flow meters, electronic circuits, semiconductor modules, and various control units.

EXAMPLE

Examples of the invention are given below by way of illustration and not by way of limitation. Parts are by weight. Viscosity is in centistoke (cSt) at 23° C.

Example 1

In 100 parts of a polymer having formula (6) (viscosity 2,100 cSt) and 33 parts of a polymer having formula (7), 1.5 parts of Aerosil R976 (Nippon Aerosil Co., Ltd.) was compounded. This was combined with 0.3 part of a 50% toluene solution of ethynyl cyclohexanol, 0.2 part of a toluene solution containing a vinylsiloxane complex of chloroplatinic acid (platinum metal concentration 0.5 wt %), 6.7 parts of a compound having formula (8), and 1.4 parts of a compound having formula (9). These components were mixed to form a composition.

The composition was press molded at 150° C. for 10 minutes and post-cured at 150° C. for 50 minutes, yielding a cured part. The physical properties (hardness, tensile strength and elongation) of the cured part were measured according to JIS K6249, with the results shown in Table 1.

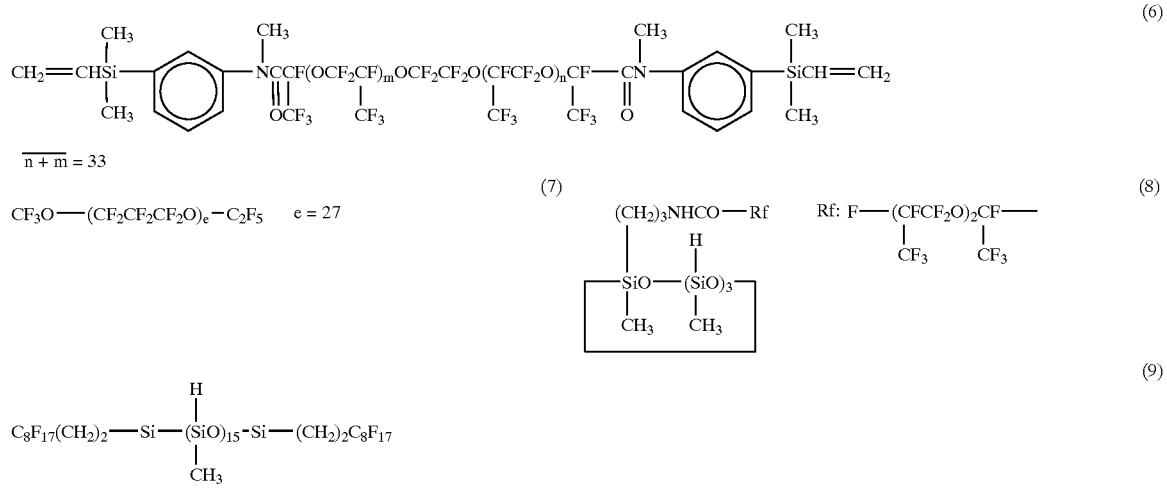

Cured Product

The composition comprising the essential and optional components described above can be cured into a product having satisfactory solvent resistance and chemical resistance. The cured product is generally obtained by well-known methods, for example, by pouring the inventive composition into a suitable mold and causing the composition to cure therein. Alternatively, the inventive composition is coated onto a suitable substrate and cured thereon. Curing is effected simply by heating at a temperature of about 60 to 150° C. for about 30 to 180 minutes.

Electric and Electronic Parts

According to the invention, various electric and electronic parts can be sealed or encapsulated with the curable composition described above. The electric and electronic parts FIG. 1 shows how the Tg of the composition varied when the polymer having formula (7) was used in different amounts.

Example 2

In 100 parts of a polymer having formula (10) (viscosity 5,600 cSt) and 25 parts of a polymer having formula (11), 4 parts of Aerosil R972 (Nippon Aerosil Co., Ltd.) was compounded. This was combined with 0.3 part of a 50% toluene solution of ethynyl cyclohexanol, 0.2 part of a toluene solution containing a vinylsiloxane complex of chloroplatinic acid (platinum metal concentration 0.5 wt %), 1.7 parts of a compound having formula (12), and 1.1 parts of the compound having formula (8). These components were mixed to form a composition.

The composition was press molded at 150° C. for 10 minutes and post-cured at 150° C. for 50 minutes, yielding a cured part. The physical properties of the cured part were measured according to JIS K6249, with the results shown in Table 1.

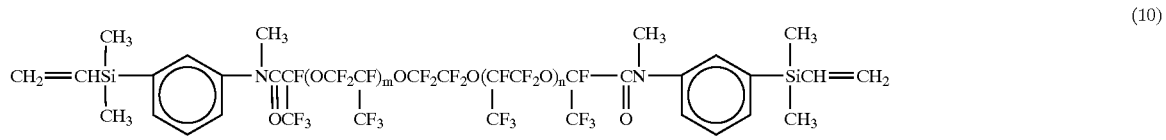

(10)

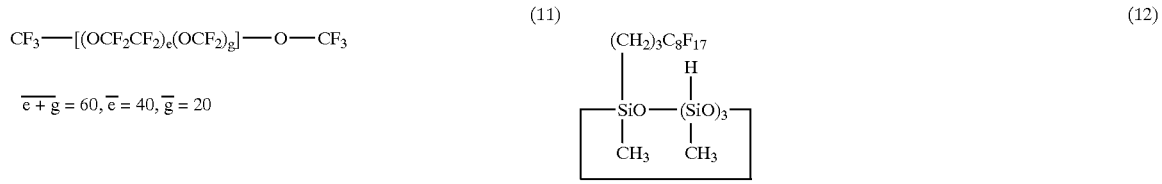

(11) (12)

Example 3

To 40 parts of the polymer having formula (6) and 60 parts of a polymer having formula (13) (viscosity 650 cSt), were added 33 parts of the polymer having formula (7), 0.15 part of a 50% toluene solution of ethynyl cyclohexanol, 0.015 part of an ethanol solution containing a vinylsiloxane complex of chloroplatinic acid (platinum metal concentration 3.0 wt %), and 15 parts of a compound having formula (14). These components were mixed to form a composition.

The composition was heated at 150° C. for one hour, forming a gel whose penetration was measured according to ASTM D-1403 (¼ cone). The result is shown in Table 2.

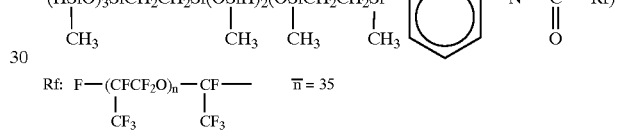

(15)

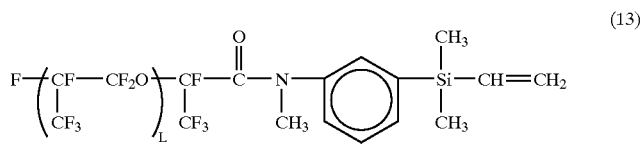

(13)

$L = 24$

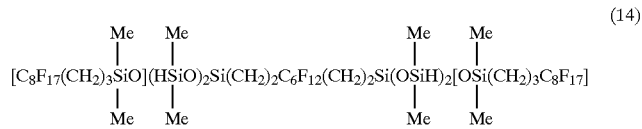

(14)

Example 4

A composition was prepared as in Example 3 except that 70 parts of the polymer having formula (10) (viscosity 5,600 cSt) was used instead of the polymer having formula (6); the amount of the polymer having formula (13) was changed to 30 parts; 25 parts of the polymer having formula (7) was added; and 25 parts of a compound having formula (15) was used instead of the compound having formula (14). From the composition, a gel was formed. The penetration of the gel was measured, with the result shown in Table 2.

Comparative Example 1

A composition was prepared as in Example 1 except that the compound having formula (7) was omitted. A cured part was similarly obtained therefrom.

Example 5

A composition was prepared as in Example 1 except that a compound having formula (16) was used instead of the compound having formula (7). A cured part was similarly obtained therefrom.

$$CF_3O-(CF_2CF_2CF_2O)_e-C_2F_5 \quad (e=50) \quad (16)$$

Comparative Example 2

A composition was prepared as in Example 2 except that the compound having formula (11) was omitted. A cured part was similarly obtained therefrom.

Comparative Example 3

A composition was prepared as in Example 2 except that the amount of the compound having formula (11) was changed from 25 parts to 50 parts. A cured part was similarly obtained therefrom.

Comparative Example 4

A composition was prepared as in Example 3 except that the compound having formula (7) was omitted. The composition was cured as in Example 3. The penetration of the gel was measured as in Example 3, with the result shown in Table 2.

Example 6

A composition was prepared as in Example 3 except that 60 parts of a polymer having formula (17) was used instead of the polymer having formula (13) and the amount of the compound having formula (14) was changed from 15 parts to 12 parts. The penetration of the gel was measured as in Example 3, with the result shown in Table 2.

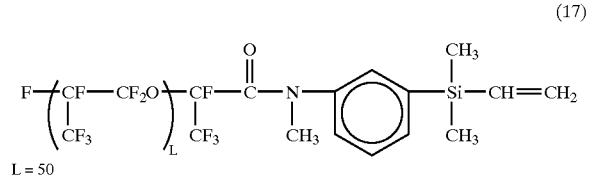

(17)

L = 50

Comparative Example 5

A composition was prepared as in Example 4 except that 60 parts of the polymer having formula (7) was additionally blended. The penetration of the gel was measured as in Example 3, with the result shown in Table 2.

The compositions were tested as follows.

Glass Transition Temperature

Tg was measured by DSC.

Solvent Swell Test

Examples 1, 2, 5 and Comparative Examples 1–3: In accordance with JIS K6258, the cured parts were immersed in a solvent at 23° C. for 7 days, after which a percent volume change was determined.

Examples 3, 4, 6 and Comparative Examples 4–5: Cured parts were formed in a glass vessel having a diameter of 35 mm and a height of 15 mm and immersed in a solvent at 23° C. for 7 days, after which a percent weight change was determined.

The solvent used was gasoline and methanol.

Bleed Test

The compositions of Examples 1–6 and Comparative Examples 1–5 were cured in a vessel having a diameter of 49 mm and a height of 10 mm by the same procedure as in Example 1. The cured sample was taken out of the vessel and placed on top of a pile of five paper filters (diameter 125 mm), and a weight of 500 g was placed on the sample. The assembly was held at 23° C. for 1,000 hours, following which the weight gain of paper filters excluding the filter adjoining the sample was determined and reported as bleedout. The results are shown in Table 3.

TABLE 1

|  | Example | | | Comparative Example | | |
|---|---|---|---|---|---|---|
|  | 1 | 2 | 5 | 1 | 2 | 3 |
| Hardness (Durometer type A) | 30 | 25 | 29 | 35 | 28 | 23 |
| Tensile strength (MPa) | 1.0 | 1.2 | 1.3 | 1.1 | 1.3 | 1.0 |
| Elongation (%) | 160 | 230 | 160 | 150 | 180 | 200 |
| Swell in gasoline (%) | 4.2 | 2.8 | 5.8 | 5.8 | 3.4 | 2.7 |
| Swell in methanol (%) | 1.2 | 1.0 | 1.2 | 1.2 | 1.1 | 1.1 |
| Tg (° C.) | −72 | −72 | −68 | −48 | −46 | −65 |

TABLE 2

|  | Example | | | Comparative Example | |
|---|---|---|---|---|---|
|  | 3 | 4 | 6 | 4 | 5 |
| Penetration | 70 | 30 | 72 | 65 | 35 |
| Swell in gasoline (%) | 5.3 | 2.8 | 5.5 | 6.8 | 3.2 |
| Swell in methanol (%) | 0.4 | 0.1 | 0.2 | 0.6 | 0.1 |
| Tg (° C.) | −78 | −78 | −75 | −55 | −64 |

TABLE 3

|  | Example | | | | | |
|---|---|---|---|---|---|---|
|  | 1 | 2 | 3 | 4 | 5 | 6 |
| Bleedout (g) | 0.0 | 0.0 | 0.0 | 0.0 | 0.03 | 0.05 |

|  | Comparative Example | | | | |
|---|---|---|---|---|---|
|  | 1 | 2 | 3 | 4 | 5 |
| Bleedout (g) | 0.0 | 0.0 | 0.08 | 0.0 | 0.22 |

Example 7 & Comparative Example 6

Pressure sensors were encapsulated and protected with the compositions of Example 3 and Comparative Example 4 and subjected to a low-temperature operating test and an acid resistance test.

Low-Temperature Operating Test

The pressure sensors protected with the compositions of Example 3 and Comparative Example 4 were subjected to an operating test at −40° C.

The pressure sensors protected with the composition of Example 3 performed normally at −40° C. In contrast, the pressure sensors protected with the composition of Comparative Example 5 failed to detect a correct pressure at −40° C., and some sensors showed wire breakage due to increased hardness at the low temperature.

Acid Resistance Test

The pressure sensors protected with the compositions of Example 3 and Comparative Example 4 were immersed in aqueous solutions of sulfuric acid and nitric acid, both at pH 1, at 23° C. for 500 hours.

After 500 hours of immersion, an operating test was carried out. The pressure sensors protected with the composition of Comparative Example 4 malfunctioned whereas the pressure sensors protected with the composition of Example 3 performed normally. In the pressure sensors protected with the composition of Comparative Example 5, the corrosion of semiconductor, wire and lead sections was found.

Example 8 & Comparative Example 7

Aerometers were encapsulated and protected with the compositions of Examples 1–6 and Comparative Examples 1–5 and subjected to a heat shock test.

Heat Shock Test

The protected aerometers were subjected to 1,000 thermal cycles between −40° C. (1 hour) and 150° C. (1 hour). The aerometers protected with Examples 1–6 performed normally. The aerometers protected with Comparative Examples 1, 2, 4 showed wire breakage due to increased hardness at the low temperature. The aerometers protected with Comparative Examples 3 and 5 failed to detect a flow rate of air because bled ingredients migrated through the clearance in the package to the sensitive zone.

The curable composition of the invention forms a cured product that remains flexible even at low temperatures, minimizes the bleeding of free oil ingredients from the gel under the impetus of stresses resulting from varying pressure or due to thermal cycling, and has good chemical resistance.

Japanese Patent Application No. 2002-201349 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable composition comprising
   (A) 100 parts by weight of an alkenyl-containing fluoropolymer comprising —(CF(CF$_3$)—CF$_2$—O)— units,
   (B) 20 to 40 parts by weight of an alkenyl-free, non-functional fluoropolymer comprising —[(CF$_2$)$_k$O]— units wherein k is 1 to 6,
   (C) a cure effective amount of an organohydrogensiloxane having at least two hydrogen atoms each attached to a silicon atom in a molecule, and
   (D) a catalytic amount of a platinum group metal catalyst.

2. The curable composition of claim 1 wherein component (A) comprises a branched polyfluorodialkenyl compound of the following general formula (1):

$$CH_2=CH-(X)_a-Rf^1-(X')_a-CH=CH_2 \quad (1)$$

wherein X is a divalent group represented by —CH$_2$—, —CH$_2$O—, —CH$_2$OCH$_2$— or —Y—NR$^1$—CO— wherein Y is a divalent group represented by —CH$_2$— or

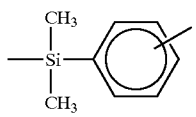

and R$^1$ is hydrogen or a substituted or unsubstituted monovalent hydrocarbon group, X' is a divalent group represented by —CH$_2$—, —OCH$_2$—, —CH$_2$OCH$_2$— or —CO—NR$^1$—Y'— wherein Y' is a divalent group represented by —CH$_2$— or

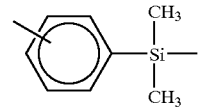

and R$^1$ is as defined above, "a" is independently equal to 0 or 1,

Rf$^1$ is a divalent group having the general formula (i):

$$-C_tF_{2t}-[OCF_2CF(CF_3)]_p-O-CF_2(CF_2)_rCF_2-O-[CF(CF_3)CF_2O]_q-C_tF_{2t}- \quad (i)$$

wherein p and q each are an integer of 1 to 150, the sum of p and q on average is 2 to 200, r is an integer of 0 to 6, and t is 2 or 3, or the general formula (ii):

$$-C_tF_{2t}-[OCF_2CF(CF_3)]_u-(OCF_2)_v-OC_tF_{2t}- \quad (ii)$$

wherein u is an integer of 1 to 200, v is an integer of 1 to 50, and t is as defined above.

3. The curable composition of claim 2 wherein component (A) further comprises a branched polyfluoromonoalkenyl compound of the following general formula (2):

$$Rf^2-(X')_a-CH=CH_2 \quad (2)$$

wherein X' and "a" are as defined above, Rf$^2$ is a group of the general formula (iii):

$$F-[CF(CF_3)CF_2O]_w-C_tF_{2t}- \quad (iii)$$

wherein t is as defined above, and w is an integer of 1 to 150, which is smaller than any of the sum of p+q (average) and r and the sum of u and v for Rf$^1$ in formula (1).

4. The curable composition of claim 2 wherein component (B) is at least one linear polyfluoro compound selected from the group consisting of compounds having the general formula (3):

$$A-O-(CF_2CF_2CF_2O)_c-A \quad (3)$$

wherein A is a group of the formula: C$_s$F$_{2s+1}$— wherein s is 1 to 3, and c is an integer of 1 to 200, which is smaller than any of the sum of p+q (average) and r and the sum of u and v for Rf$^1$ in formula (1), and compounds having the general formula (4):

$$A-O-(CF_2O)_d(CF_2CF_2O)_e-A \quad (4)$$

wherein A is as defined above, d and e each are an integer of 1 to 200, and the sum of d and e is equal to or smaller than any of the sum of p+q (average) and r and the sum of u and v for Rf$^1$ in formula (1).

5. An electric or electronic part encapsulated with the curable composition of any one of claims 1–4.

6. The curable composition of claim 1 wherein a amount of hydrosilyl (Si—H) groups in component (C) is 0.2 to 2 moles per mole of entire alkenyl groups in component (A).

7. The curable composition of claim 1 wherein the amount of the catalyst is about 0.1 to 100 parts by weight of platinum group metal per million parts by weight of components (A) and (C) combined.

* * * * *